United States Patent
Griffin et al.

(10) Patent No.: US 11,295,226 B2
(45) Date of Patent: Apr. 5, 2022

(54) OPTIMIZATION RECOMMENDATION SERVICES FOR QUANTUM COMPUTING

(71) Applicant: Red Hat, Inc., Raleigh, NC (US)

(72) Inventors: Leigh Griffin, Waterford (IE); Luigi Zuccarelli, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 856 days.

(21) Appl. No.: 16/117,623

(22) Filed: Aug. 30, 2018

(65) Prior Publication Data

US 2020/0074346 A1 Mar. 5, 2020

(51) Int. Cl.
*G06N 10/00* (2019.01)
*G06N 20/00* (2019.01)

(52) U.S. Cl.
CPC ............. *G06N 10/00* (2019.01); *G06N 20/00* (2019.01)

(58) Field of Classification Search
CPC ........ G06N 10/00; G06N 20/00; G06N 20/10; G06N 3/0454; G06N 3/0445; G06N 99/002; G06N 99/005
See application file for complete search history.

(56) References Cited

U.S. PATENT DOCUMENTS

| | | | |
|---|---|---|---|
| 10,592,216 B1* | 3/2020 | Richardson | G06F 8/60 |
| 2003/0166490 A1 | 9/2003 | Shefer et al. | |
| 2012/0170091 A1* | 7/2012 | Goto | B82Y 10/00 359/107 |
| 2018/0375790 A1* | 12/2018 | Dadashikelayeh | G06F 9/4806 |
| 2019/0220782 A1* | 7/2019 | Chen | G06N 5/003 |
| 2020/0285539 A1* | 9/2020 | Fowler | G06F 11/1076 |

OTHER PUBLICATIONS

Britt, "Instruction Set Architectures for Quantum Processing Units", 2017. (Year: 2017).*
Khammassi, "cQASM v1.0 Towards a Common Quantum Assembly Language", May 2018. (Year: 2018).*
Nikolaj Moll et al., "Quantum optimization using variational algorithms on near-term quantum devices", IOP Publishing, Quantum Sci. Technol. 3 (2018) 030503, 18 pages.
Yunseong Nam et al., "Automated optimization of large quantum circuits with continuous parameters", npj Quantum Information 4, Article No. 23 (2018), 40 pages.

* cited by examiner

*Primary Examiner* — Dave Misir
(74) *Attorney, Agent, or Firm* — Lowenstein Sandler LLP

(57) ABSTRACT

Aspects of the disclosure provide for mechanisms for providing optimization recommends for quantum computing. A method of the disclosure includes: receiving a first file including a first plurality of quantum instructions for implementing an algorithm; receiving hardware information of a plurality of quantum computer systems, wherein the hardware information comprises information about hardware capacities of the quantum computer systems; and generating, by a processing device, one or more optimization recommendations for implementing the algorithm in view of the first plurality of instructions and the hardware information. In some embodiments, the one or more optimization recommendations include an estimated qubit size required to implement the algorithm in at least one of the plurality of quantum computer systems.

16 Claims, 10 Drawing Sheets

1013 // include base library (gate definitions)
include "qelib1.inc";

1011 // define qubit size
qreg q[2];

// define measurement registers
creg c[2];

1015 // hardmard gate – set to superposition
h q[0];

1017 // x gate – flip the state
x q[1];

1019 // cnot gate – set the qubits to the bell state (entangled state)
cx q[0],q[1];

//make the measurements
measure q[0] -> c[0];
measure q[1] -> c[1];

1021 // Decorated Metadata for use by other services
1023 // frequency 20
// modification_timestamp 20180101

FIG. 10

OPTIMIZATION RECOMMENDATION SERVICES FOR QUANTUM COMPUTING

TECHNICAL FIELD

The implementations of the disclosure generally relate to computer systems and, more specifically, to providing optimization recommendations for quantum computing.

BACKGROUND

Quantum computers perform computations utilizing quantum-mechanical phenomena, such as superposition and entanglement. Unlike classical computers that process data encoded in binary bits, each of which is always in one of two definite states ("0" or "1"), quantum computers process data in units of quantum bits (qubits) that can be in superpositions of states. "Superposition" refers to the ability of each qubit to represent both a "1" and a "0" at the same time. The qubits in a superposition can be correlated with each other (referred to as "entanglement"). That is, the state of a given qubit (whether it is a "1" or a "0") can depend on the state of another qubit. A quantum computer with N qubits can be in a superposition of up to $2^N$ states simultaneously. Compared to the classical computers that can only be in one of these $2^N$ states at a particular time, quantum computers have higher compute power and may solve difficult problems that are intractable using the classical computers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 10 illustrates an example of a quantum assembly file in accordance with some embodiments of the present disclosure.

DETAILED DESCRIPTION

Figure 1:
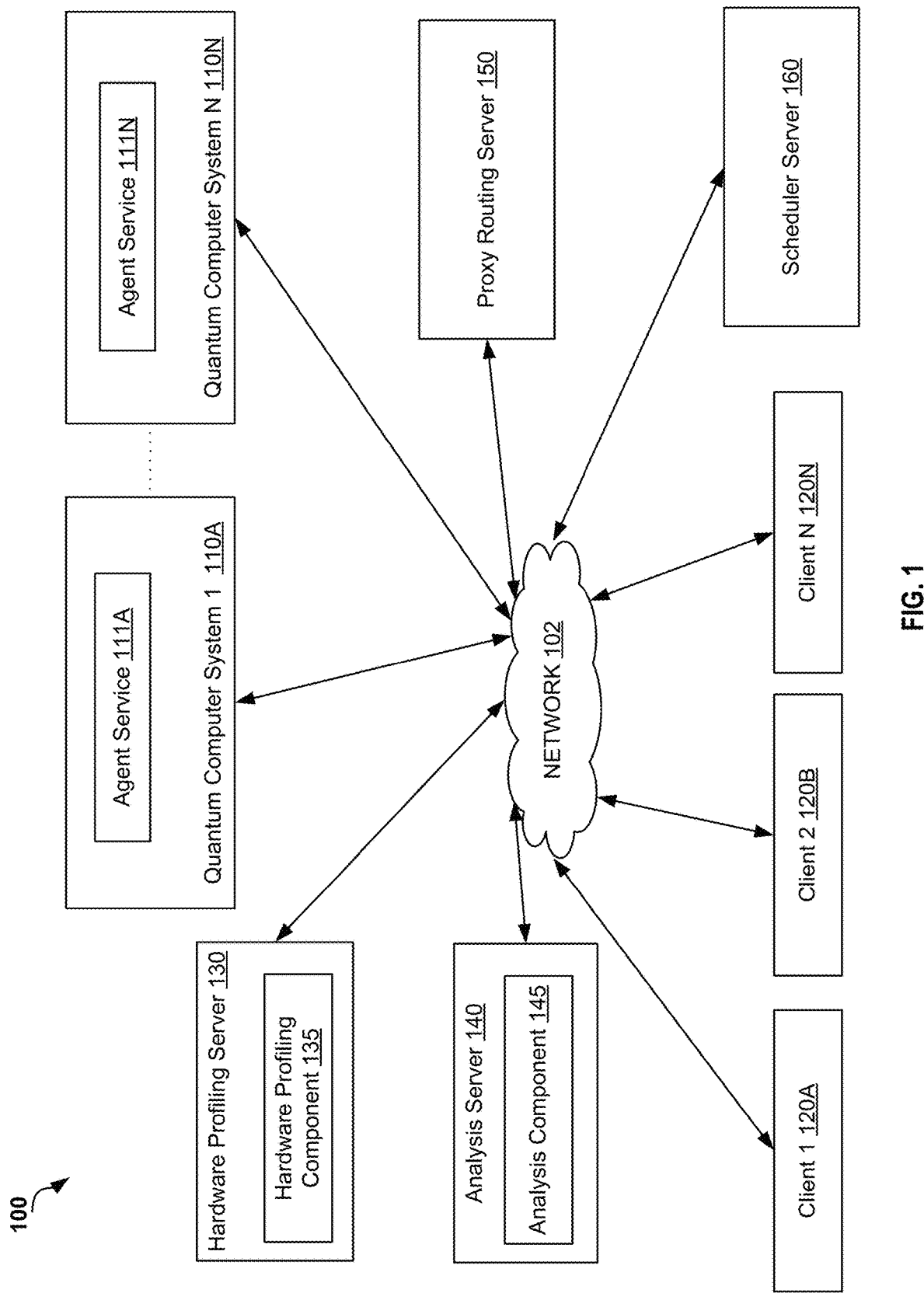
FIG. 1 is a block diagram of a network architecture in which implementations of the disclosure may operate.

Quantum computing utilizes quantum-mechanical phenomena, such as superposition and entanglement. Quantum computing may involve initializing the quantum states of a set of qubits, allowing the quantum states of the qubits to evolve under the influence of quantum gates, and observing (e.g., measuring) the qubits after they have evolved. As referred to herein, a qubit (or "quantum bit") is a basic unit of quantum information that can be used in quantum computing. The qubit may be regarded as a quantum system that exists in quantum superpositions of two independent quantum states. The probability that the quantum system is in either quantum state at a given time is not zero. An example of such a quantum system is the spin of an electron, wherein the up or down spin can correspond to a zero, a one, or a superposition of states in which it is both up and down at the same time. The spin-up and the spin-down state may be referred to as the state of "|0>" and the state of "|1>," respectively. Performing a calculation using the electron involves performing the calculation simultaneously for both a zero and a one. As such, the qubit can be both a zero and a one at the same time. The qubit can be in one or more quantum states, such as the state of "|0>," the state of "|1>," or a linear combination of the states of "|0>" and "|1>" (a superposition of the states of "|0>" and "|1>"). At a particular time, the qubit may be regarded as being in a superposition of the states of "|0>" and "|1>." N qubits may provide a system with a state that is a combination of $2^N$ states simultaneously.

As referred to herein, a quantum gate may be a logic gate operating on one or more qubits. Applying the logic gate to the one or more qubits may be regarded as performing one or more operations defined by linear algebra over Hilbert space and represented by unitary matrices. The quantum gate may be reversible (e.g., receiving an input of n-bit data and returning an output of n-bit data). The quantum gate may control the evolution of distinguishable quantum states of the qubits and define calculations corresponding to the evolution. This evolution may be regarded as performing $2^N$ simultaneous calculations. The output of the quantum gate may be determined by measuring the quantum states of the qubits after the evolution. Examples of the quantum gate may include a Hadamard gate, a Pauli-X gate, a Pauli-Y gate, a Pauli-z gate, a swap gate, a phase shift gate, etc. A quantum gate operating on one qubit may be referred to as a "single-qubit gate" herein. A quantum gate operating on multiple qubits may be referred to as a "multi-qubit gate" herein.

As referred to herein, "quantum computing device" or "quantum computer" may be a device that is capable of performing quantum computing. A quantum computing device may implement an algorithm defined by a sequence of quantum gates and initial values of one or more qubits. The implementation of the algorithm may end with a measurement, collapsing the system of qubits into one of $2^N$ states, where each of the qubits is zero or one. The algorithm may implement any suitable function. Examples of the algorithm may include an algorithm for public-key cryptography, an algorithm for searching for a specified entry (e.g., an entry of specified features) in an unordered data set, an algorithm for setting two qubits in an entangled state, an algorithm for determining the exclusive—or (XOR) mask over which a given black-box function is invariant, etc.

As discussed above, a quantum computing device with N qubits may be in a superposition of up to $2^N$ states simultaneously. As such, the processing capacity of the quantum computing device is limited by the number of qubits available in the quantum computing device. In addition, it is expensive to build and maintain quantum computing devices. Performing computations in the quantum computing devices is similarly expensive. Accordingly, knowledge of hardware requirements for performing a certain computation is necessary for accurate and efficient quantum computing. Conventional solutions for quantum computing fail to provide mechanisms for estimating hardware requirements and optimizing implementations of algorithms in quantum computing, resulting in time-consuming and costly overhead executions of programs using quantum computers.

Aspects of the present disclosure address the above deficiencies and other deficiencies of conventional quantum computing mechanisms by providing mechanisms (e.g., systems, methods, computer-readable medium, etc.) that can estimate hardware requirements for implementing an algorithm in quantum computer systems and optimize the implementation of the algorithm. A hardware profiling component in accordance with the present disclosure can gather hardware information of a plurality of quantum computer systems and can generate hardware profiles of the quantum computer systems in view of the hardware information. The hardware profiles of the quantum computer systems may include, for example, temperature information of the quantum computer systems, qubit capacities of the quantum computer systems, coherence information of the quantum computer systems, etc. The hardware profiling component can transmit the hardware profiles to an analysis component for processing.

The analysis component may provide optimization recommendations for executions of algorithms in the quantum computer systems. For example, the analysis component may receive an input file including instructions for implementing an algorithm in the quantum computer systems. The input file may be, for example, a quantum assembly file, such as a Quantum Assembly Language (QASM) file. The input file may include a first qubit size indicative of a first number of qubits to be used to implement the algorithm(s). The first qubit size may be provided by a user. The analysis component may also receive user metadata related to the input file for analysis of the input file. Examples of the user metadata may include a coherence time limit (e.g., the longest coherence time that is allowed to implement the algorithm(s)), an error rate limit (e.g., the maximum error rate allowed to implement the algorithm(s)), etc.

The analysis component may analyze the input file, the hardware profiles provided by the hardware profiling server, the user metadata, and/or any other suitable data and provide optimization recommendations for the implementation of the algorithm(s) in view of the analysis. For example, the analysis component may process the input file and/or the user metadata using a logic analyzer trained to predict hardware requirements to implement an algorithm in a quantum computing system, such as a qubit size representative of an estimation of the number of qubits required to implement the algorithm(s) (also referred to as the "estimated qubit size"), a gating strategy (e.g., one or more quantum gates to be employed) to implement the algorithm, etc. The analysis component may also identify one or more of the quantum computer systems as destination quantum computer systems that are capable of implementing the algorithm(s).

The analysis component can generate one or more optimization recommendations in view of the analysis. For example, the optimization recommendations may include the estimated qubit size, the gating strategy, identification of the destination quantum computer systems, etc. The optimization recommendations may be incorporated into the input file as comments in some embodiments.

Accordingly, aspects of the present disclosure provide for mechanisms that enable implementations of algorithms in quantum computer systems with appropriate hardware. Compared to conventional quantum computing techniques, the mechanisms disclosed herein may avoid running an algorithm on an over spaced and overpowered machine, which would be more expensive and should be reserved for appropriate algorithm choices. This may allow the mechanisms to optimize the implementation of the algorithm, resulting in efficient and accurate quantum computing.

FIG. 1 is a block diagram of an example of a computer system 100 according to some embodiments of the present disclosure. As illustrated, the computer system 100 may include one or more quantum computer systems (e.g., quantum computer systems 110A, 110N), client devices (e.g., clients 120A, 120B, 120N), a hardware profiling server 130, an analysis server 140, a proxy routing server 150, a scheduler server 160, and/or any other suitable component in accordance with the present disclosure.

The quantum computer system 110A-110b, the clients 120A-120N, the hardware profiling server 130, the analysis server 140, the proxy routing server 150, and the scheduler server 160 may be connected via a network 102, which may be a private network (e.g., a local area network (LAN), a wide area network (WAN), intranet, or other similar private networks) or a public network (e.g., the Internet).

Each of the quantum computer system 110A-110b, the clients 120A-120N, the hardware profiling server 130, the analysis server 140, the proxy routing server 150, and the scheduler server 160 may include a server, a workstation, a personal computer (PC), a mobile phone, a palm-sized computing device, a personal digital assistant (PDA), and/or any other suitable computing device. "Computing device" as used herein may be and/or include a device comprising one or more processors, one or more memory devices, and one or more input/output (I/O) interfaces. A computer system may be a system including one or more computing devices.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The hardware profiling server 130 may monitor hardware information of the quantum computer systems 110A-110N and can perform profiling functions based on the hardware information. For example, a hardware profiling component 135 of the hardware profiling server 130 may communicate with an agent service deployed on a respective quantum computer system (e.g., agent services 111A-111N) to acquire hardware information of the respective quantum computer system. In some implementations, the hardware profiling component 135 may communicate with the agent service 111A deployed on the quantum computer system 110A to acquire hardware information of the quantum computer system 110A. The hardware information may include, for example, a qubit capacity of the quantum computer system 110A (e.g., the number of qubits that can be used for quantum computing by the quantum computer system 110A), temperature information of the quantum computer system 110A (e.g., a current temperature of the quantum computer system 110A, the lowest temperature or a desired temperature at which the quantum computer system 110A can operate, etc.), coherence information of the quantum computer system 110A (e.g., a current coherence time indicative of an amount of time available to perform the quantum computation by the of the quantum computer system 110A), etc.

The hardware profiling component 135 may then generate a hardware profile for the quantum computer system 110A in view of the acquired hardware information. The hardware profile may include the hardware information and may be formatted in any suitable format to be processed by one or more components of the computer system 100. The hardware profiling component 135 may then transmit the hardware profile to the analysis server 140 for analysis. In some embodiments, the hardware profiling component 135 may generate a hardware profile for each of the quantum computer systems 110A-110N or one or more selected quantum computer systems and can transmit the hardware profiles to the analysis server 140 for analysis. In some embodiments, the hardware profiling component 135 may perform various operations discussed herein with reference to FIGS. 2, 3, and 6.

The analysis server 140 may provide optimization recommendations for executions of algorithms in the quantum computer systems 110A-110N. For example, an analysis component 145 can receive a file including instructions for implementing an algorithm in the quantum computer systems (also referred to as the "first file"). The first file may be, for example, a quantum assembly file, such as a Quantum Assembly Language (QASM) file. An example of the quantum assembly file is illustrated in FIG. 10. The first file may include a first qubit size indicative of the number of qubits (also referred to as "the first number of qubits") to be used to implement the algorithm(s). The first qubit size may be provided by a user (e.g., via a client device) in some embodiments. The first file may include information of one or more quantum gates to be used to implement the algorithm (also referred to as the "first quantum gates"). The first file may be provided by a client device in some embodiments.

The analysis component 145 may also receive user metadata related to the first file and/or the implementation of the algorithm(s) for analysis of the first file. The user metadata may be provided by one or more users (e.g., via client devices 120A-120N). Examples of the user metadata may include a coherence time limit (e.g., the longest coherence time that is allowed to implement the algorithm(s)), an error rate limit (e.g., the maximum error rate allowed to implement the algorithm(s)), etc. The error rate may be a gate error rate (the number of errors occurred during employment of one or more quantum gates in a certain period of time), a readout error rate (the number of readout errors during a certain period of time), etc. The gate error rate may be a multi-qubit gate error (e.g., the number of errors occurred during employment of one or more multi-qubit quantum gates in a certain period of time), a single-qubit gate error (e.g., the number of errors occurred during employment of one or more single-qubit quantum gates in a certain period of time), a total gate error (e.g., the number of errors occurred during employment of one or more multi-qubit quantum gates and single-qubit quantum gates in a certain period of time). In some embodiments, the user metadata may be provided as part of the first file.

The analysis component 145 may analyze the first file, the hardware profiles provided by the hardware profiling server 130, the user metadata, and/or any other suitable data and provide optimization recommendations for the implementation of the algorithm(s) in view of the analysis. For example, the analysis component 145 may process the first file and/or the user metadata using a logic analyzer trained to predict features of quantum hardware required to implement an algorithm in a quantum computing system, such as a qubit size representative of an estimation of the number of qubits required to implement the algorithm(s) (also referred to as the "second qubit size" or the "estimated qubit size"). The logic analyzer may also be trained to predict a gating strategy (e.g., one or more quantum gates to be employed to implement the algorithm) that may optimize the implementation of the algorithm (e.g., by reducing execution times, improving accuracy, etc.). The logic analyzer may include an analyzer module 223 as described in connection with FIG. 2 below.

The analysis component 145 may also select one or more of the quantum computer systems 110A-110N as destination quantum computer systems that are capable of implementing the algorithm(s). For example, the analysis component 145 can process the analysis results provided by the logical analyzer and the hardware profiles of the quantum computer system 110A-110N to determine whether one or more of the quantum computer systems can provide the hardware capacities required to implement the algorithm(s) (e.g., by determining whether a qubit capacity of a respective quantum computer system is equal to or greater than the second qubit size). The analysis component 145 may identify a quantum computer system as a destination quantum computer system in response to determining that the quantum computer system can provide the hardware capacities.

The analysis component 145 can generate one or more optimization recommendations in view of the analysis. For example, the optimization recommendations may include the second qubit size the gating strategy, identification of the destination quantum computer systems, etc.

The analysis component 145 can also generate one or more files to incorporate the optimization recommendations. For example, the analysis component 145 can generate a second file (e.g., a quantum assembly file) by modifying the first file. In some embodiments, the analysis component 145 can generate one or more comments including the optimization recommendations and can incorporating the comments into the first file to generate the second file. As such, the second file may represent an updated version (e.g., a decorated version) of the first file.

The analysis component 145 can transmit the optimization recommendations and/or the second file to one or more components of the computer system 100 for further processing. For example, the analysis component 145 can transmit the second file to a client device to inform a user of the optimization recommendations. As another example, analysis component 145 can transmit the optimization recommendations and/or the second file to the proxy routing server 150. The proxy routing server 150 can forward a request to execute the first file to the scheduler server 160 or any other server that can schedule computing tasks for the destination quantum computer systems. The scheduler server 160 can then schedule the execution of the first file on one or more of the destination quantum computer systems (e.g., by providing the first file, the second file, etc. to the destination quantum computer systems). In some embodiments, the analysis component 145 may perform various operations discussed herein with reference to FIGS. 2, 4, 7, and 8.

Figure 2:
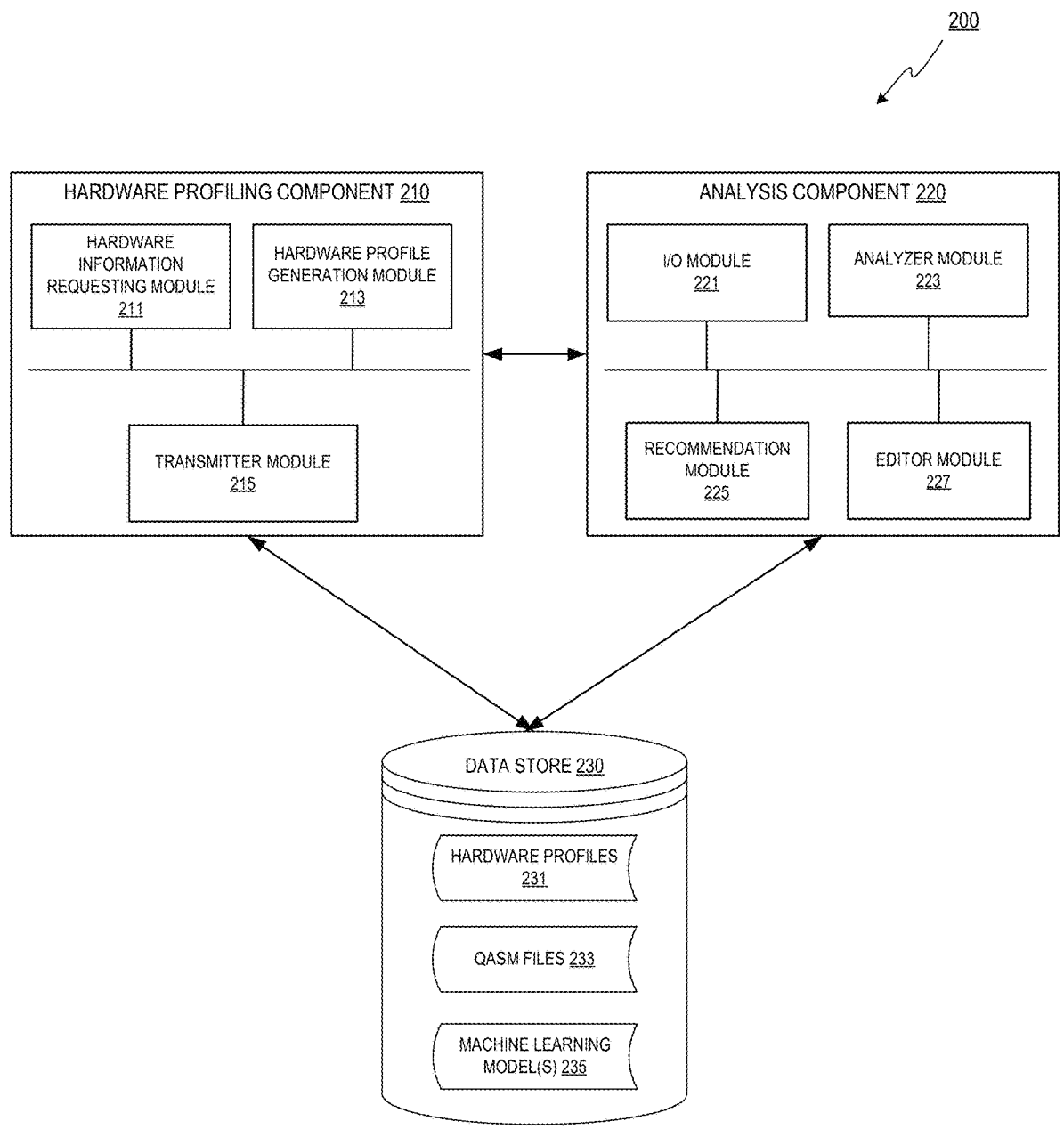
FIG. 2 is a block diagram of a detailed view of a computer system implementing a hardware profiling component and an analysis component according to an implementation of the disclosure.

FIG. 2 depicts a block diagram illustrating an example 200 of a computer system in accordance with some implementations of the disclosure. The computer system 200 may include a hardware profiling component 210 and an analysis component 220. The hardware profiling component 210 and the analysis component 220 of FIG. 2 may be same as the hardware profiling component 135 and the analysis component 145 of FIG. 1. As illustrated, the hardware profiling component 210 may include a hardware information requesting module 211, a hardware profile generation module 213, and a transmitter module 215. The analysis component 220 may include an input/output (I/O) module 221, an analyzer module 223, an editor module, and an output module 227. The hardware profiling component 210 and the analysis component 220 may communicate with a data store 230 storing data that can be used to provide optimization recommendations for quantum computing (e.g., hardware profiles 231, QASM files 233, machine learning modules 235, etc.). More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The hardware information requesting module 211 can request hardware information of one or more quantum computer systems. For example, the hardware information requesting module 211 can send a request for hardware information of a quantum computer system to an agent service deployed on the quantum computer system. The request may be sent in response to detecting a certain event (e.g., the receipt of a quantum assembly file, the receipt of a request for such hardware information from the analysis component 220 or any other device), periodically, or in any other suitable manner. The hardware information requesting module 211 may receive the hardware information of the quantum computer system (e.g., via the agent service). The hardware information requesting module 211 can request and/or receive hardware information of multiple quantum computer systems in parallel, sequentially, or in any other suitable manner.

The hardware profile generation module 213 can generate a hardware profile of the quantum computer system in view of the received hardware information. For example, the hardware profile generation module 213 may aggregate the hardware information and include the hardware information in one or more files. The files may have any suitable format that may be consumed by the analysis component 220. The transmitter module 215 can transmit the hardware profile to the analysis component 220.

The I/O module 221 of the analysis component 220 can receive inputs that can be used to provide optimization recommendations for quantum computing in accordance with the present disclosure. For example the I/O module 221 can receive one or more files including quantum instructions (e.g., one or more QASM files), user metadata related to the files, hardware profile provided by the hardware profiling component 210, etc. Each of the quantum instructions may be an instruction that may be executed by a quantum computing device.

The analyzer module 223 can construct one or more machine learning model(s) 235 for providing optimization recommendations for quantum computing. The machine learning model(s) 235 may refer to model artifacts that are created by the analyzer module 223 using training data that includes training inputs and corresponding target outputs (correct answers for respective training inputs). The analyzer module 223 may find patterns in the training data that map the training input to the target output (the answer to be predicted), and provide the machine learning models 235 that capture these patterns. The machine learning models 235 may be composed of, e.g., a single level of linear or non-linear operations (e.g., a support vector machine [SVM]) or may be a deep network, e.g., a machine learning model that is composed of multiple levels of non-linear operations. Examples of deep networks are neural networks including convolutional neural networks, recurrent neural networks with one or more hidden layers, and fully connected neural networks.

The machine learning model(s) 235 may be trained to predict features of quantum hardware required to implement an algorithm and to determine a gating strategy that may optimize the implementation of the algorithm (e.g., by reducing execution times, improving accuracy, etc.). For example, the analyzer module 223 can generate training data to train the machine learning model(s) 235. The training data may include one or more training inputs and one or more target outputs. The training inputs may include a training set of files including known quantum instructions (also referred to as the "training files"). Each of the training files may be a quantum assembly file, such as a QASM file. The training outputs may be classes representing features of quantum hardware (e.g., qubit sizes) and/or gating strategies that may optimize executions of the training files. For example, a first training file in the first training set may include a plurality of quantum instructions for implementing a first algorithm. The first training file may be a first training input that can be used to train the machine learning model(s) 235. The target output corresponding to the first training input may include a qubit size required to implement the first algorithm and a gating strategy that may optimize the implementation of the first algorithm. The target output corresponding to the first training input may be obtained by running the first training file on quantum computer systems of various hardware capacities and/or using various gating strategies. During the training of the machine learning model(s) 235, the analyzer module 223 can find patterns in the training data that can be used to map the training inputs to the target outputs. The patterns can be subsequently used by the analyzer module 235 for future predictions. For example, upon receiving an input file including unknown quantum instructions, the analyzer module 235 can use the trained machine learning model(s) 235 to predict a qubit size required to implement the first algorithm and a gating strategy that may be employed to optimize the implementation of the first algorithm (e.g., the most probable gating strategy that may be employed to optimize the implementation of the first algorithm).

The recommendation module 225 can generate one or more optimization recommendations in view of the analysis performed by the analyzer module 223. For example, the recommendation module 225 can generate an optimization recommendation including the qubit size representative of the estimation of the number of qubits required to implement the algorithm(s), the gating strategy, etc. As another example, the recommendation module 225 can identify one or more destination quantum computer systems that are capable of implementing an algorithm (e.g., by determining whether a qubit capacity of a respective quantum computer system is equal to or greater than the qubit size required to implement the algorithm). The one or more destination quantum computer systems may be selected from a plurality of quantum computer systems. The recommendation module 225 can then generate an optimization recommendation including identifying information that can be used to identify the destination quantum computer systems.

The editor module 227 can also generate one or more files to incorporate the optimization recommendations. For example, the editor module 227 can generate a second file (e.g., a quantum assembly file) by modifying the first file. In some embodiments, the editor module 227 can generate one or more comments including the optimization recommendations and can incorporating the comments into the first file to generate the second file. The I/O module can transmit the optimization recommendations and/or the second file to another device for processing.

Figure 3:
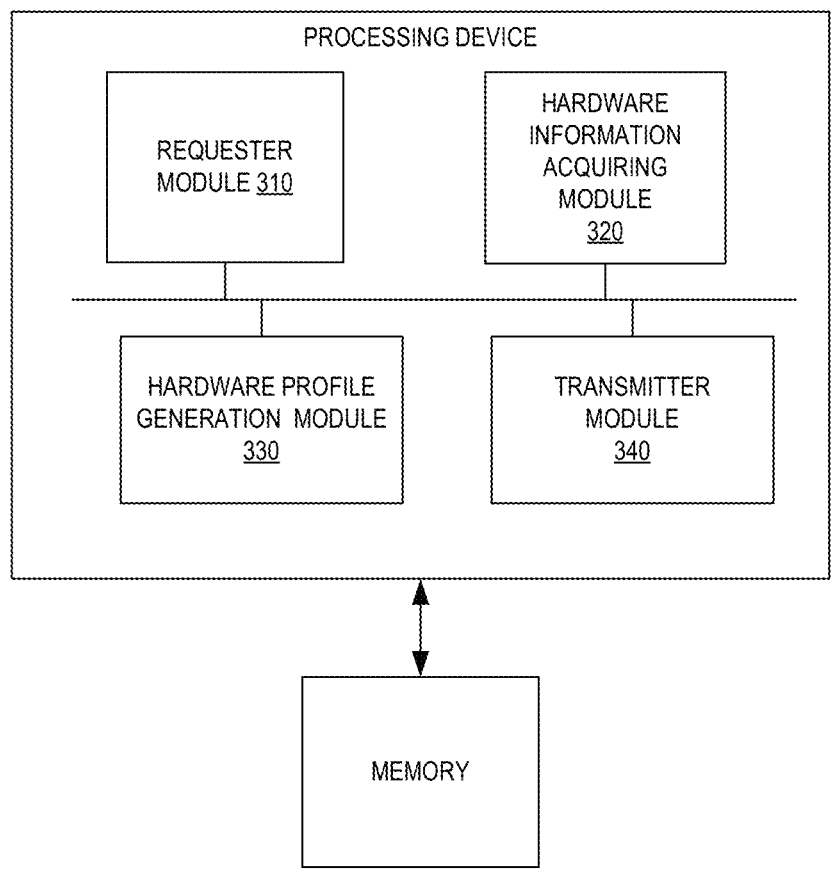
FIGS. 3, 4, and 5 depict block diagrams of example computer systems operating in accordance with one or more aspects of the present disclosure.
Figure 4:
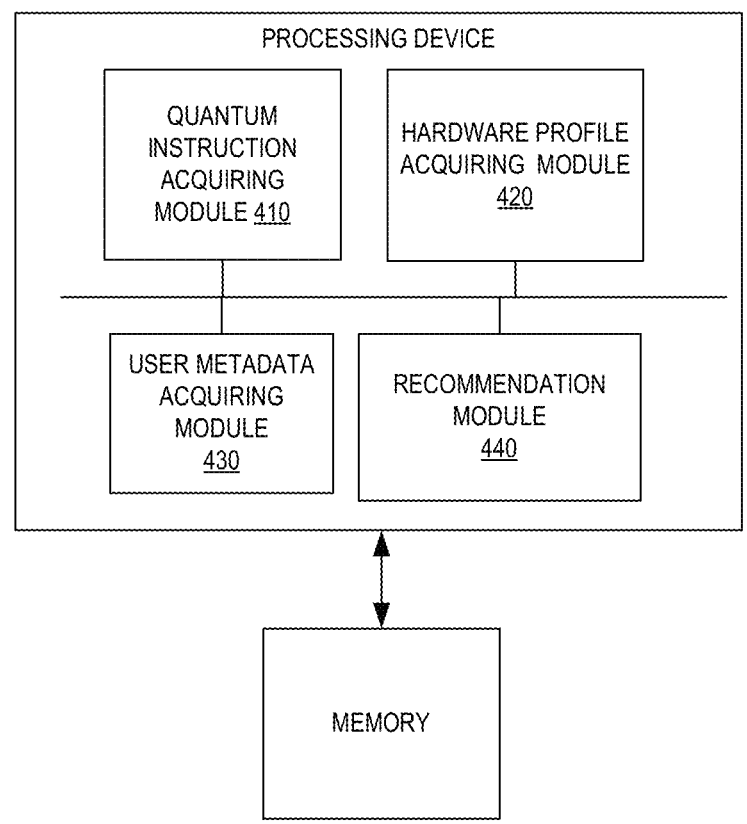
Figure 5:
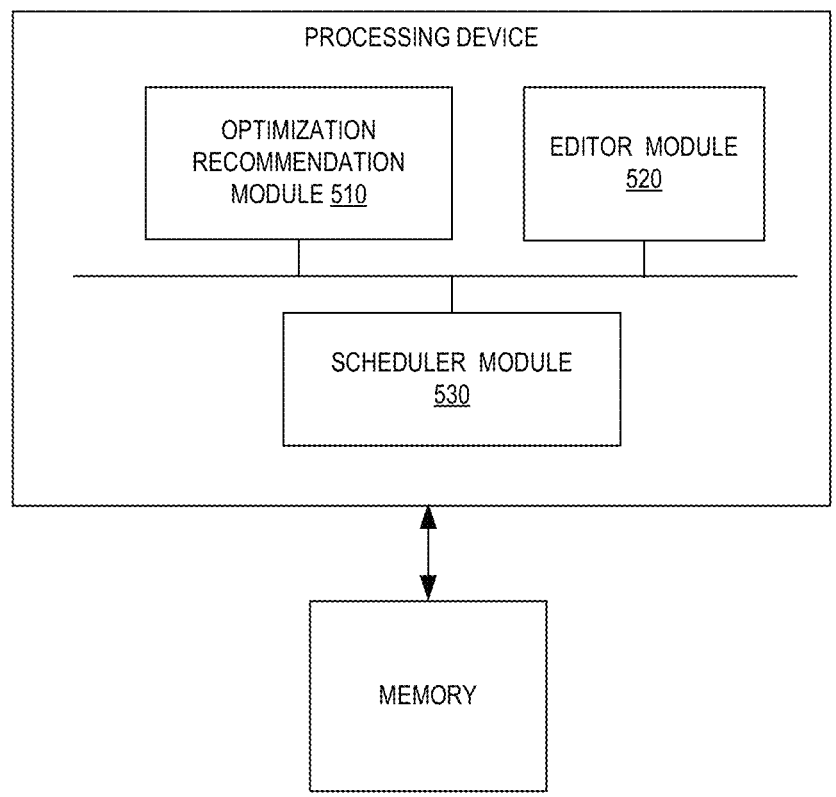

FIGS. 3, 4, and 5 depict block diagrams of example computer systems operating in accordance with one or more aspects of the present disclosure. Each of computer systems 300, 400, and 500 may be the same or similar to computer system 100 and may include one or more processing devices and one or more memory devices. Each of computer systems 300, 400, and 500 may further include a memory storing data that can be used to implement various embodiments of the present disclosure.

Referring to FIG. 3, computer system 300 may include a requester module 310, a hardware information acquiring module 320, a hardware profile generation module 330, and a transmitter module 340.

The requester module 310 can request hardware information of a quantum computer system. For example, the requester module 310 can send a request for the hardware information to an agent service deployed on the quantum computer system. The agent service may gather the hardware information (e.g., by making one or more operating system level calls) and transmit the gathered hardware information to the processing device. In some embodiments, the request for the hardware information may include a request to transmit the hardware information in a particular manner (e.g., periodically, upon detecting of a change in the hardware information or any other suitable event).

The hardware information acquiring module 320 may receive the hardware information of the quantum computer system. The hardware information of the quantum computer system may include information of hardware capacities of the quantum computer system and/or any other information of the quantum computer system that may affect the performance of the quantum computer system. For example, the hardware information of the quantum computer system may include a qubit capacity of the quantum computer system (e.g., the number of qubits available in the respective quantum computing device), coherence information of the respective quantum computing device (e.g., a first coherent time indicative of an amount of time required for a quantum computation, a second coherent time indicative of an amount of time available to perform the quantum computation by the quantum computer system, etc.), an error rate of the quantum computer system (e.g., a gate error rate, a readout error, a multi-qubit gate error, etc.), temperature information of the quantum computing device, an activation frequency representative of how frequently the qubits are activated, a calibration time indicative the last time when the quantum computer system was calibrated, load information of the quantum computer system, etc.

The hardware profile generation module 330 can generate a hardware profile in view of the hardware information of the quantum computer system. The hardware profile may represent a combination of the hardware information of the quantum computing devices. The hardware profile may include the hardware information of the quantum computer system formatted in any suitable format that can be consumed by an analysis server or any other suitable device that may process the hardware profile.

The transmitter module 340 may transmit the hardware profile of the quantum computer system to one or more devices for processing. For example, the transmitter module 340 can transmit the hardware profile to the analysis server 140 of FIG. 1 for generating optimization recommendations.

Referring to FIG. 4, computer system 400 may include a quantum instruction acquiring module 410, a hardware profile acquiring module 420, a user metadata acquiring module 430, and a recommendation module 440.

The quantum instruction acquiring module 410 can acquire quantum instructions for implementing one or more algorithms. The quantum instructions may be acquired, for example, by receiving one or more files including the quantum instructions (e.g., one or more QASM files, such as a quantum assembly file as illustrated in FIG. 10). For example, the quantum instruction acquiring module 410 may acquire a first file including a first plurality of quantum instructions for implementing an algorithm. The first file may include a first qubit size indicative of a first number of qubits to be used to implement the algorithm. The first qubit size may be provided by a user. The first file may also include information of one or more quantum gates to be employed to implement the algorithm (also referred to as the "first quantum gates").

The hardware profile acquiring module 420 may acquire hardware profile information of one or more quantum computer systems. The hardware profile information may include one or more hardware profiles of the quantum computer systems. The hardware profile information may represent hardware capacities of the quantum computer system. The hardware profile information may include, for example, temperature information of the quantum computer system (e.g., a current temperature of the quantum computer system, a temperature capacity of the quantum computer system, etc.), coherence information of the quantum computer system (e.g., one or more coherence times), etc. The hardware profiles of the quantum computer systems may include one or more hardware profiles generated in accordance with FIGS. 1-3 and 7.

The user metadata acquiring module 430 may acquire user metadata related to the quantum instructions received by the quantum instruction acquiring module 420. The user metadata may include a coherence time limit, an error rate limit (e.g., a gate error limit, a readout error rate limit, etc.). The coherence time limit may indicate the longest coherence time allowed to implement the algorithms. The error rate limit may indicate the maximum error rate allowed to implement the algorithms. The user metadata may be provided by one or more users.

The recommendation module 440 can generate one or more optimization recommendations for implementing the algorithm(s) in view of the first file, the hardware profile information, and/or the user metadata. The optimization recommendations may include a second qubit size indicative of an estimated number of qubits required to implement the algorithm(s), a gating strategy for implementing the algorithm(s) with reduced execution times and/or improved accuracy and efficiency of the implementation of the algorithm(s), identifying information of one or more of the quantum computer systems that are capable of implementing the algorithm(s).

Referring to FIG. 5, computer system 500 may include an optimization recommendation module 510, an editor module 520, and a scheduler module 530.

The optimization recommendation module 510 may obtain one or more optimization recommendations for implementing one or more algorithms using quantum computing. The algorithm(s) may be encoded in a first file including a first plurality of quantum instructions for implementing the algorithm(s). In one implementation, the optimization recommendations may be obtained by performing one or more operations described in connection with block 740 of FIG. 7 below. In another implementation, the optimization recommendations may be obtained by receiving the optimization recommendations from another device (e.g., recommendation module 440 of FIG. 4).

The editor module 520 can generate one or more files in view of the one or more optimization recommendations. For example, the editor module 520 can generate a second file may including a second plurality of quantum instructions for implementing the algorithm(s). The first plurality of quantum instructions may or may not be the same as the second plurality of quantum instructions. The second file may be a quantum assembly file, such as a QASM file.

The editor module 520 can generate the second file by modifying the first file in view of the one or more optimization recommendations. For example, the editor module 520 can generate one or more comments including the optimization recommendations and can incorporating the comments into the first file. As another example, the processing device can modify one or more of the first plurality of instructions to generate the second file. In one implementation, the processing device can modify the first file by replacing the first qubit size with the second qubit size in response to determining that the first qubit size is not the same as the second qubit size. In another implementation, the processing device can modify one or more of the first plurality of instructions in view of the gating strategy. In some embodiments, the processing device can replace one or more of the first quantum gates with one or more second quantum gates in view of the gating strategy. The second quantum gates may include one or more single-qubit gates. As still another example, the editor module 520 can modify the first file by incorporating metadata into the first file in view of the optimization recommendations. The metadata may include data about the destination quantum computer systems, an activation frequency, a modification timestamp, etc. The metadata may be incorporated into the first file as one or more comments in some embodiments.

The scheduler module 530 can schedule an execution of the algorithm(s) in view of the optimization recommendations. For example, the scheduler module 530 can forward a request to execute the first file and can provide the first file, the second file, etc. to the proxy routing server 150 and/or the scheduler server 160 of FIG. 1. As another example, the scheduler module 530 can forward a request to execute the first file and can provide the first file, the second file, etc. to the destination quantum computer systems for execution.

Figure 6:
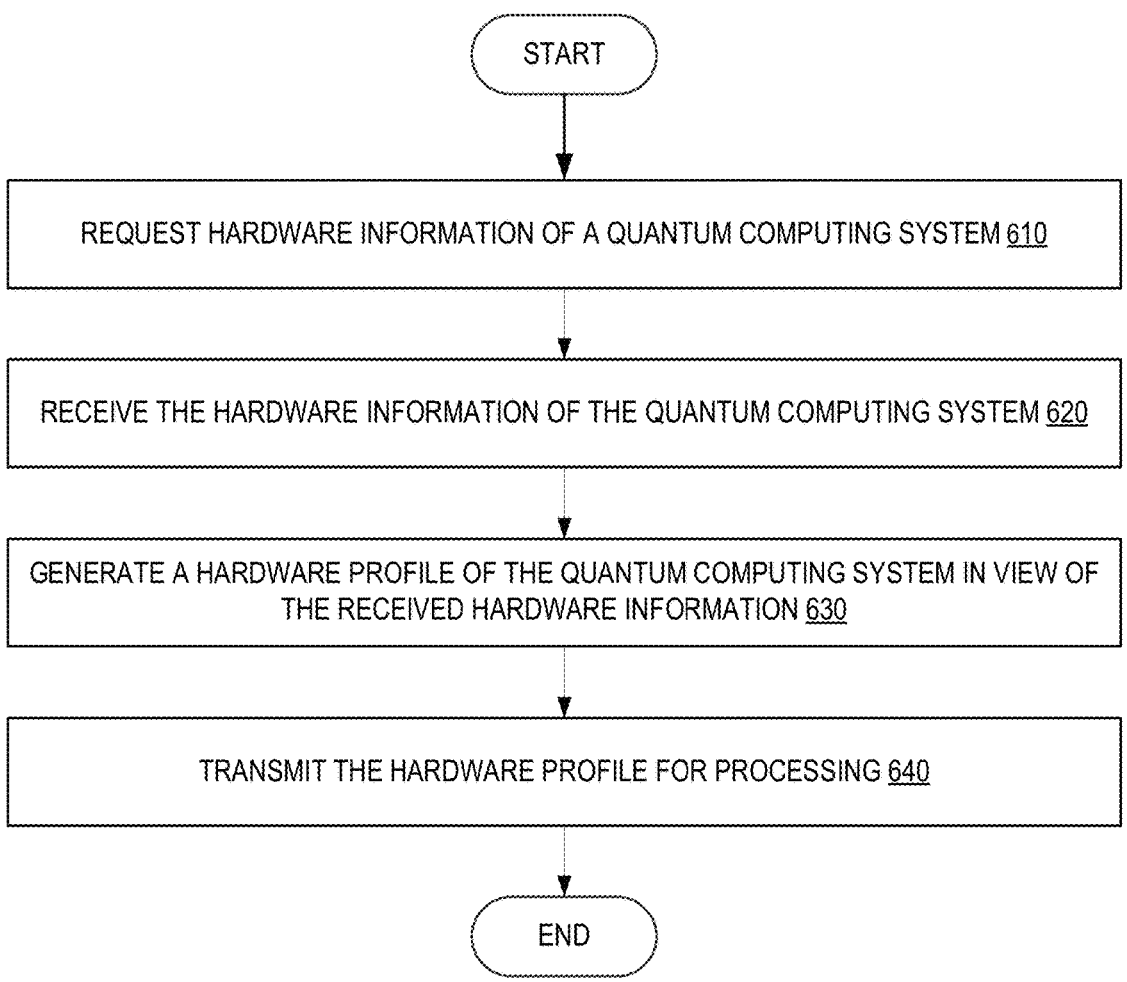
FIG. 6 is a flow diagram illustrating a method for hardware profiling for a quantum computer system in a computer system in accordance with some embodiments of the present disclosure.
Figure 7:
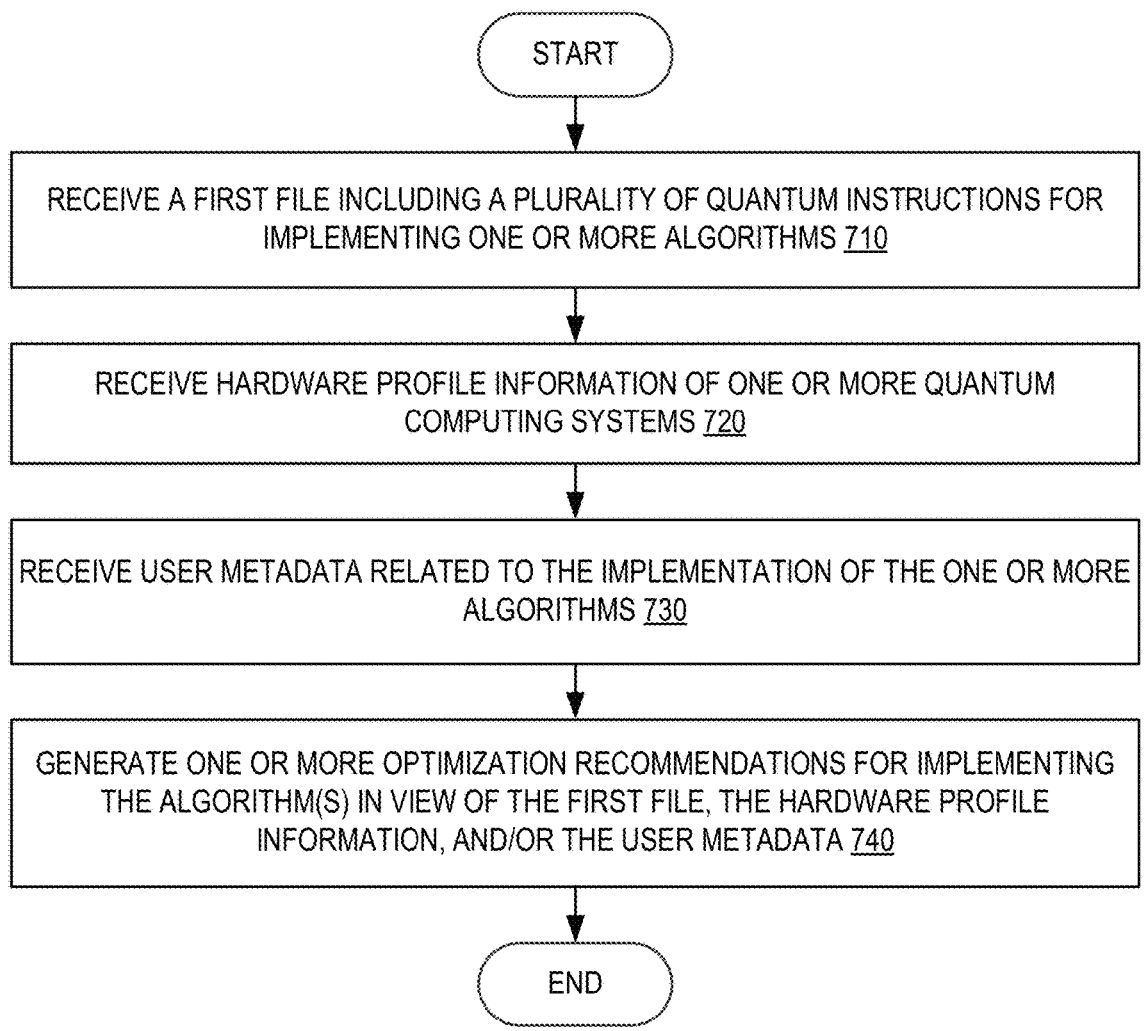
FIG. 7 is a flow diagram illustrating a method for providing optimization recommendations for quantum computing in accordance with some embodiments of the present disclosure.
Figure 8:
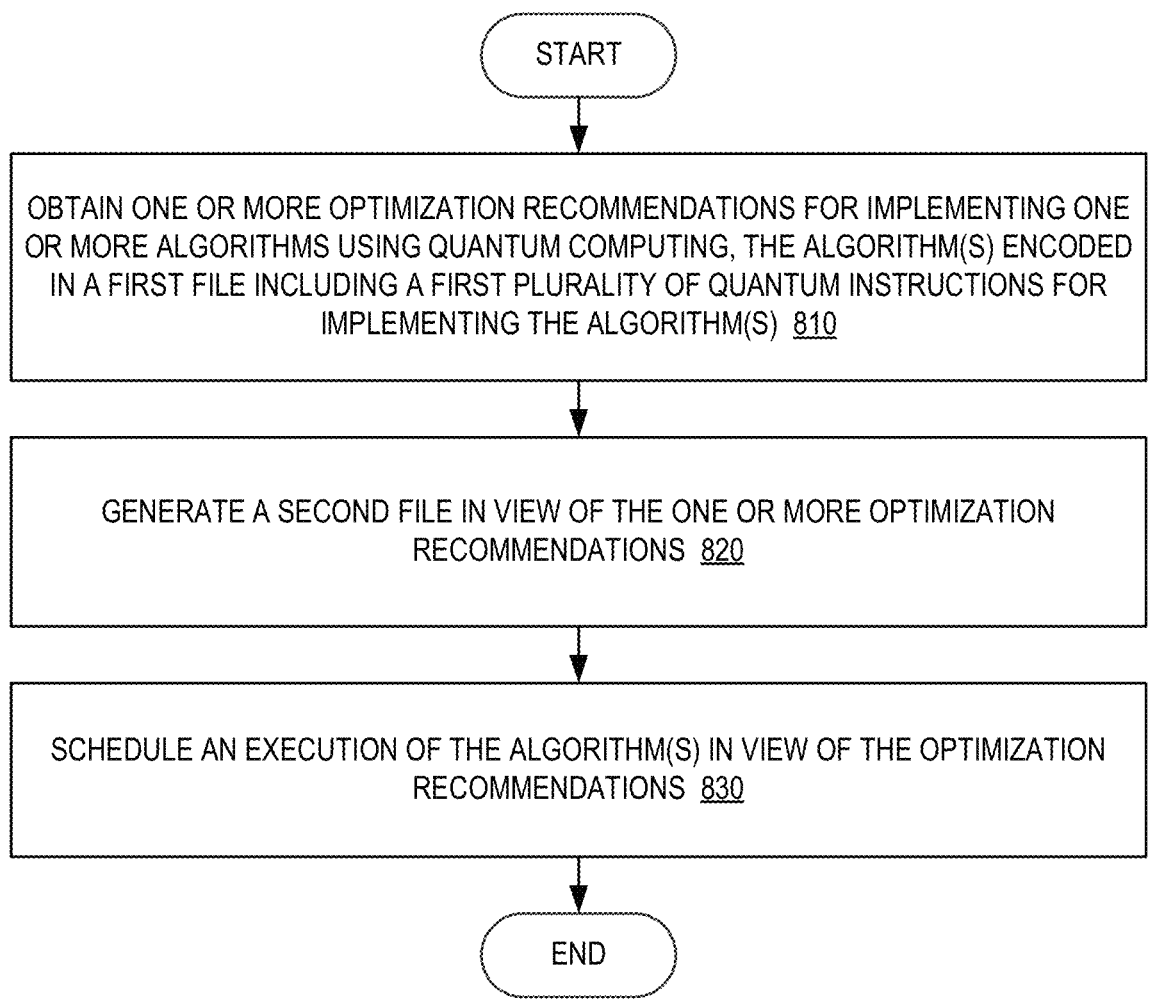
FIG. 8 is a flow diagram illustrating a method for scheduling executions of algorithms in quantum computer systems in accordance with some embodiments of the present disclosure.

FIGS. 6, 7, and 8 are flow diagrams illustrating methods 600, 700, and 800 for providing a quantum hardware and software recommendation service in accordance with one or more aspects of the present disclosure. Method 600 illustrates an example process for hardware profiling for a quantum computer system in accordance with some embodiments of the present disclosure. Method 700 illustrates an example process for providing optimization recommendations for quantum computing in accordance with some embodiments of the present disclosure. Method 800 illustrates an example process for scheduling executions of algorithms in quantum computer systems in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Refereeing to FIG. 6, method 600 begins at block 610 where a processing device may request hardware information of a quantum computer system. The processing device can request the hardware information by communicating with an agent service deployed on the quantum computer system. The agent service may gather the hardware information (e.g., by making one or more operating system level calls) and transmit the gathered hardware information to the processing device.

In some embodiments, block 610 may be omitted. For example, the quantum computing devices may transmit the hardware information periodically, at random times, in response to detecting a certain event, or in any other suitable manner.

At block 620, the processing device may receive the hardware information of the quantum computer system. The hardware information of the quantum computer system may include information of hardware capacities of the quantum computer system and/or any other information of the quantum computer system that may affect the performance of the quantum computer system. For example, the hardware information of the quantum computer system may include a qubit capacity of the quantum computer system (e.g., the number of qubits available in the respective quantum computing device).

As another example, the hardware information of the quantum computer system may include coherence information of the respective quantum computing device. The coherence information may include one or more coherent times, such as a first coherent time indicative of an amount of time required for a quantum computation, a second coherent time indicative of an amount of time available to perform the quantum computation by the quantum computer system, a third coherence time indicating a state of the quantum computer system (e.g., a current coherence time indicative of an amount of time available to perform the quantum computation by the quantum computer system), etc.

As still another example, the hardware information of the quantum computer system may include an error rate of the respective quantum computing device. The error rate may be and/or include, for example, a gate error rate, a readout error rate, etc.

As a further example, the hardware information of the quantum computer system may include temperature information of the respective quantum computing device. The temperature information may include one or more temperatures, such as a current temperature of the quantum computer system, a temperature capacity of the quantum computer system (e.g., a given temperature at which the quantum computer system e may operate, such as the lowest temperature or a desired temperature at which the quantum computer system may operate), etc.

As still a further example, the hardware information of the quantum computer system may include an activation frequency representative of how frequently the qubits are activated in the quantum computer system. As yet another example, the hardware information of the respective quantum computing device may include a calibration time related to the quantum computer system (e.g., the last time when the quantum computer system was calibrated). As a further example, the hardware information of the quantum computer system may include information indicating how loaded the respective quantum computing device is.

At block 630, the processing device may generate a hardware profile of the quantum computer system in view of the received hardware information. The hardware profile may represent a combination of the hardware information of the quantum computing devices. The hardware profile may include the hardware information of the quantum computer system formatted in any suitable format that can be consumed by an analysis server or any other suitable device that may process the hardware profile.

At block 640, the processing device can transmit the hardware profile for processing. For example, the processing device can transmit the hardware profile to the analysis server 140 of FIG. 1 for generation of optimization recommendations and/or to any other device that can process the hardware profile.

Refereeing to FIG. 7, method 700 begins at block 710 where the processing device may receive a first file including a plurality of quantum instructions for implementing one or more algorithms. Each of the quantum instructions may be an instruction that can be executed by a quantum computing device. The first file may be in any format suitable for representing quantum instructions. In some embodiments, the first file may be a quantum assembly file. For example, the first file may be and/or include a Quantum Assembly Language (QASM) file.

In some embodiments, the first file and/or the quantum instructions may include information that can be used to implement the algorithm(s). For example, the first file may include a first qubit size indicative of the number of qubits (also referred to as "the first number of qubits") to be used to implement the algorithm(s). The first qubit size may be provided by a user in some embodiments. As another example, the first file may include information of one or more quantum gates to be used to implement the algorithm (also referred to as the "first quantum gates"). In some embodiments, the quantum instructions in the first file may include one or more instructions for implementing the algorithm(s) using the first quantum gates.

At block 720, the processing device can receive hardware profile information of one or more quantum computer systems. The hardware profile information may represent hardware capacities of the quantum computer system. The hardware profile information may include, for example, temperature information of the quantum computer system (e.g., a current temperature of the quantum computer system, a temperature capacity of the quantum computer system, etc.), coherence information of the quantum computer system (e.g., one or more coherence times), etc.

The hardware profile information of the quantum computer system may be received from a server or any other suitable processing device executing method 700 of FIG. 7.

At block 730, the processing device can receive user metadata related to implementation of the algorithm(s). As an example, the user metadata may include a coherence time limit, an error rate limit (e.g., a gate error rate limit, a readout error rate limit, a multi-qubit gate error rate limit, etc.). The user metadata may be provided by one or more users. The user metadata may be received from a client device as described in connection with FIG. 1 or any other suitable device.

At block 740, the processing device can generate one or more optimization recommendations for implementing the algorithm(s) in view of the first file, the hardware profile information, and/or the user metadata. The optimization recommendations may include any information that can be used to optimize the implementation of the algorithm(s) (e.g., to improve accuracy and efficiency of the implementation of the algorithm(s)). For example, the optimization recommendations may include a second qubit size (e.g., an estimated qubit size) indicative of the number of qubits that may be used to implement the algorithm(s) (also referred to as the "second number of qubits") using one or more quantum computer systems. The second number of bits may represent an estimation of the number of qubits needed to implement the algorithm(s) using the one or more quantum computer systems determined by the processing device or any other suitable device. The second qubit size may or may not be the same as the first qubit size. As another example, the optimization recommendations may include a gating strategy for implementing the algorithm(s). Implementing the algorithm(s) utilizing the gating strategy may result in reduced execution times and/or improved accuracy and efficiency of the implementation of the algorithm(s). The gating strategy may include, for example, changing one or more of the first quantum gates (e.g., by replacing one or more of the first quantum gates with one or more single-qubit gates) and/or adding one or more quantum gates. As still another example, the optimization recommendations may include one or more of the quantum computer systems that are capable of implementing the algorithm(s) (also referred to as the "destination quantum computer systems"). In some embodiments, to generate the optimization recommendations, the processing device can select, from the plurality of quantum computer systems, one or more of quantum computer systems that can provide the second qubit size or other hardware capacities required to implement the algorithm(s) as the destination quantum computer systems.

The optimization recommendations may be generated using a machine learning model trained to provide optimization recommendations for implementations of algorithms in quantum computer systems (e.g., using the analyzer module 223 as described in connection with FIG. 2 above).

Refereeing to FIG. 8, method 800 begins at block 810 where a processing device may obtain one or more optimization recommendations for implementing one or more algorithms using quantum computing. The algorithm(s) may be provided in a first file including a first plurality of quantum instructions for implementing the algorithm(s). In one implementation, the optimization recommendations may be obtained by performing one or more operations described in connection with block 740 of FIG. 7 above. In another implementation, the optimization recommendations may be obtained by receiving the optimization recommendations from another device (e.g., a device executing method At block 820, the processing device can generate a second file in view of the one or more optimization recommendations. The second file may include a second plurality of quantum instructions for implementing the algorithm(s). The first plurality of quantum instructions may or may not be the same as the second plurality of quantum instructions. The second file may be a quantum assembly file, such as a QASM file.

The processing device can generate the second file by modifying the first file in view of the one or more optimization recommendations. For example, the processing device can generate one or more comments including the optimization recommendations and can incorporating the comments into the first file. More particularly, for example, the comments may include a first comment including the second qubit size, a second comment including the gate strategy, a third comment including information related to the destination quantum computer systems (e.g., identifiers of the destination quantum computer systems), etc.

As another example, the processing device can modify one or more of the first plurality of instructions to generate the second file. In one implementation, the processing device can modify the first file by replacing the first qubit size with the second qubit size in response to determining that the first qubit size is not the same as the second qubit size. In another implementation, the processing device can modify one or more of the first plurality of instructions in view of the gating strategy. In some embodiments, the processing device can replace one or more of the first quantum gates with one or more second quantum gates in view of the gating strategy. The second quantum gates may include one or more single-qubit gates.

As still another example, the processing device can modify the first file by incorporating metadata into the first file in view of the optimization recommendations. The metadata may include data about the destination quantum computer systems, an activation frequency, a modification timestamp, etc. The metadata may be incorporated into the first file as one or more comments in some embodiments.

At 830, the processing device can schedule an execution of the algorithm(s) in view of the optimization recommendations. For example, the processing device can forward a request to execute the first file and can provide the first file, the second file, etc. to the destination quantum computer systems for execution.

Figure 9:
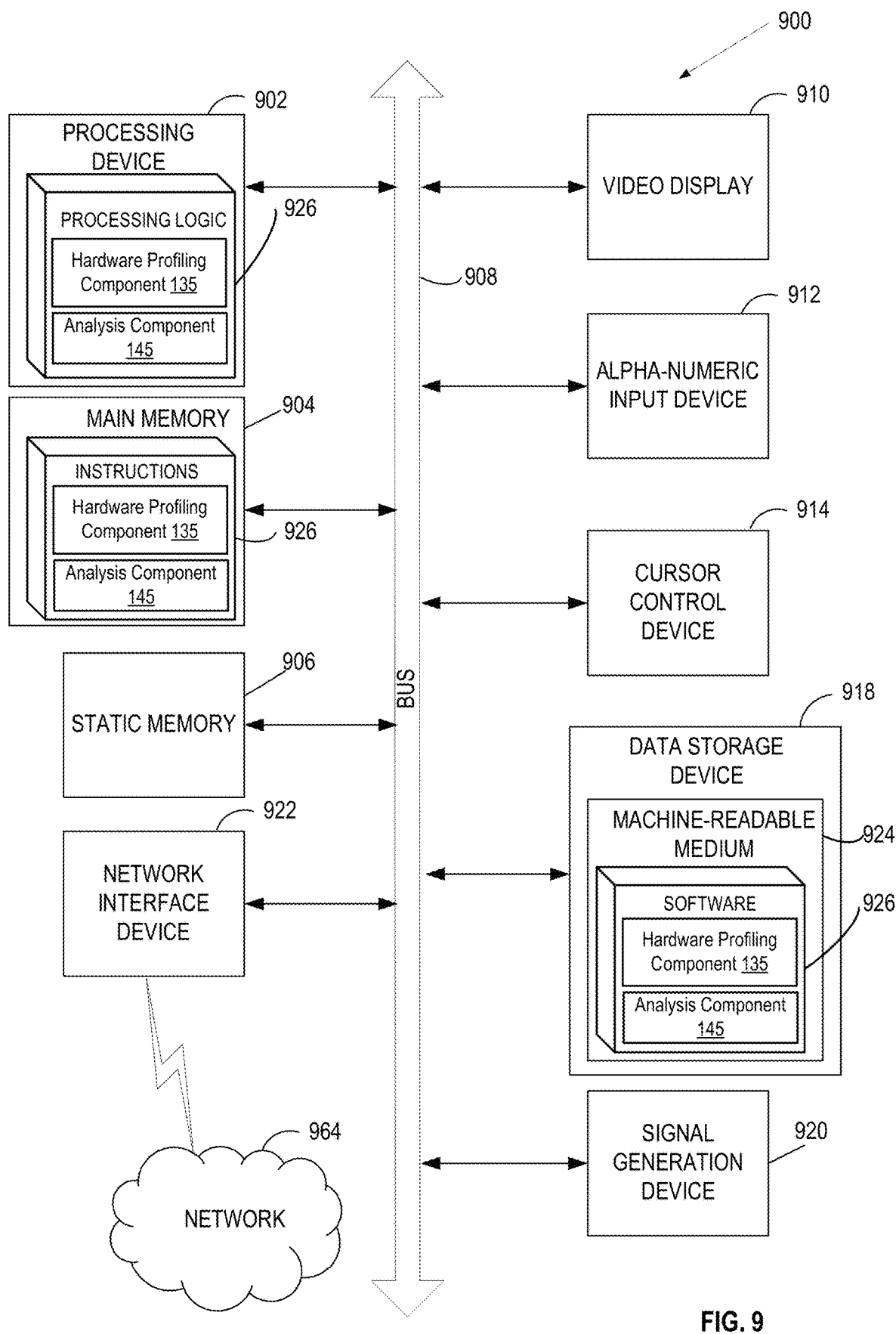
FIG. 9 illustrates a block diagram of one implementation of a computer system in accordance with some embodiments of the present disclosure.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to providing optimization recommendations for quantum computer systems, such as the hardware profiling component 135 and the analysis component 145 as described with respect to FIGS. 1 and 2, and/or a software library containing methods that call the above applications. While the machine-accessible storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Referring to FIG. 10, an example 1000 of a quantum assembly file in accordance with some embodiments of the present disclosure is shown. File 1000 may include one or more instructions for implementing an algorithm that sets two qubits in an entangled state (e.g., instructions 1011, 1013, 1015, 1017, 1019, etc.). Each of the instructions may be a quantum instruction that can be executed by a quantum computing device. As illustrated, file 1000 may include an instruction 1011 defining a qubit size (e.g., a number of qubits) to be used to implement the algorithm. File 1000 may also include one or more instructions including information about one or more quantum gates to be used to execute the algorithm. For example, file 1000 may include an instruction 1013 referring to a library that provides definitions of the quantum gates. As another example, file 1000 may include instructions 1015, 1017, and 1019 that specify the quantum gates to be used to implement the algorithm.

File 1000 may also include one or more comments including metadata that can be used to implement the algorithm. For example, as illustrated in FIG. 10, file 1000 may include a comment 1021 including an activation frequency, a comment 1023 including a modification timestamp, etc.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: receiving a first file including a first plurality of quantum instructions for implementing an algorithm; receiving hardware information of a plurality of quantum computer systems, wherein the hardware information comprises information about hardware capacities of the quantum computer systems; and generating, by a processing device, one or more optimization recommendations for implementing the algorithm in view of the first plurality of instructions and the hardware information.

Example 2 includes the subject matter of example 1, wherein the first file comprises a Quantum Assembly Language (QASM) file.

Example 3 includes the subject matter of example 1, wherein generating the one or more optimization recommendations comprises processing the first file using a machine learning model.

Example 4 includes the subject matter of example 3, further comprising: receiving user metadata comprising at least one of a coherence time limit or an error rate limit; and processing the user metadata using the machine learning model to generate the one or more optimization recommendations.

Example 5 includes the subject matter of example 1, wherein the first plurality of quantum instructions comprises a first instruction for implementing the algorithm using a first number of qubits, and wherein the one or more optimization recommendations comprise a second number of qubits to be used to implement the algorithm.

Example 6 includes the subject matter of example 1, wherein the first plurality of instructions comprises implementing the algorithm using a quantum gate, and wherein the one or more optimization recommendations comprise a gating strategy for modifying the quantum gate.

Example 7 includes the subject matter of example 1, wherein the hardware information of the quantum computer systems comprises temperature information of the quantum computer systems.

Example 8 includes the subject matter of example 1, wherein the hardware information of the quantum computer system comprises coherence information of the quantum computer systems.

Example 9 includes the subject matter of example 1, further comprising: generating, in view of the one or more optimization recommendations, a second file including a second plurality of quantum instructions for implementing the algorithm.

Example 10 includes the subject matter of example 9, wherein the one or more optimization recommendations comprise identifying information of at least one of the quantum computer systems capable of implementing the algorithm, and wherein the second file comprises one or more comments including the identifying information.

Example 11 is a method, comprising: requesting hardware information of a quantum computer system from an agent service deployed on the quantum computer system; receiving, from a quantum computer system, hardware information of the quantum computer system; and generating, by a processing device, a hardware profile of the quantum computer system in view of the hardware information.

Example 12 includes the subject matter of example 11, further comprising transmitting the hardware profile to a server for processing.

Example 13 includes the subject matter of example 11, wherein the hardware profile comprises a qubit capacity of the quantum computer system.

Example 14 includes the subject matter of example 11, wherein the hardware profile comprises coherence information of the quantum computer system.

Example 15 includes the subject matter of example 14, wherein the coherence information comprises a coherent time indicative of an amount of time available to perform quantum computing.

Example 16 includes the subject matter of example 14, wherein the coherence information comprises a current coherent time indicative of a state of the quantum computer system.

Example 17 includes the subject matter of example 11, wherein the hardware profile comprises an error rate of the quantum computer system.

Example 18 includes the subject matter of example 11, wherein the hardware profile comprises temperature information of the quantum computer system.

Example 19 includes the subject matter of example 18, wherein the temperature information comprises at least one of a current temperature of the quantum computer system or a temperature capacity of the quantum computer system.

Example 20 includes the subject matter of example 11, wherein the individual hardware profile comprises an activation frequency representative of how frequently the qubits are activated in the quantum computer system.

Example 21 includes the subject matter of example 11, wherein the hardware profile comprises a calibration time related to the quantum computer system.

Example 22 is a method, comprising: obtaining one or more optimization recommendations for implementing an algorithm using quantum computing, wherein the algorithm is provided in a first file including a first plurality of quantum instructions; generating, by a processing device, a second file in view of the one or more optimization recommendations; and scheduling an execution of the algorithm in view of the optimization recommendations.

Example 23 includes the subject matter of example 22, wherein the first file comprises a first qubit size representative of a number of qubits to be used to implement the algorithm.

Example 24 includes the subject matter of example 22, wherein generating the second file in view of the one or more optimization recommendations comprises: generating one or more comments including the optimization recommendations; and incorporating the one or more comments into the first file.

Example 25 includes the subject matter of example 24, wherein the one or more comments comprise a first comment indicating a second qubit size representative of an estimated number of qubits required to implement the algorithm.

Example 26 includes the subject matter of example 24, wherein the one or more comments comprise a second comment indicating a gating strategy for implementing the algorithm.

Example 27 includes the subject matter of example 24, wherein the one or more comments comprise a third comment identifying a quantum computer system capable of implementing the algorithm.

Example 28 includes the subject matter of example 22, wherein the second file comprises metadata indicating at least one of an activation frequency or a calibration time.

Example 29 includes the subject matter of example 22, wherein the first file comprises a Quantum Assembly Language (QASM) file.

Example 30 includes the subject matter of example 22, wherein the second file comprises a Quantum Assembly Language (QASM) file.

Example 31 includes the subject matter of example 22, further comprising transmitting the second file to a client device.

Example 32 is an apparatus comprising: a processing device; and a means for receiving a first file including a first plurality of quantum instructions for implementing an algorithm; a means for receiving hardware information of a plurality of quantum computer systems, wherein the hardware information comprises information about hardware capacities of the quantum computer systems; and a means for generating, by a processing device, one or more optimization recommendations for implementing the algorithm in view of the first plurality of instructions and the hardware information.

Example 33 includes the apparatus of claim 32, further comprising the subject matter of any of claims 1-32.

Example 34 is a system comprising: a memory; and a processing device operatively coupled to the memory, the processing device to implement the subject matter of any of examples 1-31.

Example 35 is a non-transitory machine-readable storage medium including instructions that, when accessed by a processing device, cause the processing device to implement the subject matter of any of examples 1-31.

Unless specifically stated otherwise, terms such as "receiving," "transmitting," "processing," "providing," "storing," "performing," "detecting," "analyzing," "obtaining," "generating," "determining," "updating," "modifying," "acquiring," "selecting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
receiving a first Quantum Assembly Language (QASM) file comprising a first plurality of quantum instructions for implementing an algorithm;
extracting, from the first QASM file, user metadata specifying a first number of qubits identified for implementation of the algorithm;
receiving hardware information of a plurality of quantum computer systems, wherein the hardware information comprises information about hardware capacities of the plurality of quantum computer systems;
processing the first QASM file by a logic analyzer that comprises a machine learning model trained to estimate a number of qubits that implement a quantum algorithm, wherein the machine learning model is trained with one or more training files, wherein each of the one or more training files comprises training quantum instructions that are executed, during training, on two or more of the plurality of quantum computer systems; and
modifying, by a processing device, the first QASM file to generate a second QASM file in view of the user metadata, an output of the processing of the first QASM by the logic analyzer, and the received hardware information, wherein the second QASM file comprises one or more optimization recommendations, and wherein the one or more optimization recommendations comprise a second number of qubits estimated to implement the algorithm in at least one of the plurality of quantum computer systems.

2. The method of claim 1, wherein the user metadata further comprises at least one of a coherence time limit acceptable for execution of the first plurality of quantum instructions or a maximum error rate acceptable for execution of the first plurality of quantum instructions.

3. The method of claim 1, wherein the first plurality of quantum instructions comprises implementing the algorithm using a quantum gate, and wherein the one or more optimization recommendations comprise a gating strategy for modifying the quantum gate.

4. The method of claim 1, wherein the hardware information of the plurality of quantum computer systems comprises temperature information for each of the plurality of quantum computer systems.

5. The method of claim 1, wherein the hardware information of the plurality of quantum computer systems comprises coherence information for each of the plurality of quantum computer systems.

6. The method of claim 1, wherein the second QASM file includes a second plurality of quantum instructions for implementing the algorithm, wherein the second plurality of quantum instructions is different from the first plurality of quantum instructions of the first QASM file.

7. The method of claim 6, wherein the one or more optimization recommendations comprise an identifying information of at least one of the plurality of quantum computer systems capable of implementing the algorithm, and wherein the second QASM file comprises at least one comment that includes the identifying information.

8. The method of claim 1, wherein an output of processing the first QASM file by the logic analyzer comprises one or more of:
an identification of one or more quantum computer hardware features required to implement the algorithm, or
a gating strategy that implements the algorithm.

9. A system comprising:
a memory; and
a processing device operatively coupled to the memory, the processing device to:
receive a first Quantum Assembly Language (QASM) file comprising a first plurality of quantum instructions for implementing an algorithm;
extract, from the first QASM file, user metadata specifying a first number of qubits identified for implementation of the algorithm;
receive hardware information of a plurality of quantum computer systems, wherein the hardware information comprises information about hardware capacities of the plurality of quantum computer systems;
process the first QASM file by a logic analyzer that comprises a machine learning model trained to estimate a number of qubits that implement a quantum algorithm, wherein the machine learning model is trained with one or more training files, wherein each of the one or more training files comprises training quantum instructions that are executed, during training, on two or more of the plurality of quantum computer systems; and
modify the first QASM file to generate a second QASM file in view of the user metadata, an output of the processing of the first QASM by the logic analyzer, and the received hardware information, wherein the second QASM file comprises one or more optimization recommendations, and wherein the one or more optimization recommendations comprise a second number of qubits estimated to implement the algorithm in at least one of the plurality of quantum computer systems.

10. The system of claim 9, wherein the user metadata further comprises at least one of a coherence time limit acceptable for execution of the first plurality of quantum instructions or a maximum error rate limit acceptable for execution of the first plurality of quantum instructions.

11. The system of claim 9, wherein the first plurality of quantum instructions comprises implementing the algorithm using a quantum gate, and wherein the one or more optimization recommendations comprise a gating strategy for modifying the quantum gate.

12. The system of claim 9, wherein the hardware information of the plurality of quantum computer systems comprises at least one of temperature information for each of the plurality of quantum computer systems or coherence information of the plurality of quantum computer systems.

13. The system of claim 9, wherein the one or more optimization recommendations comprise identifying information for one or more of the plurality of quantum computer systems.

14. The system of claim 9, wherein the second QASM file includes a second plurality of quantum instructions for implementing the algorithm, wherein the second plurality of quantum instructions is different from the first plurality of quantum instructions of the first QASM file.

15. The system of claim 9, wherein an output of processing the first QASM file by the logic analyzer comprises one or more of:
   an identification of one or more quantum computer hardware features required to implement the algorithm, or
   a gating strategy that implements the algorithm.

16. A non-transitory machine-readable storage medium including instructions that, when accessed by a processing device, cause the processing device to:
   receive a first Quantum Assembly Language (QASM) file comprising a first plurality of quantum instructions for implementing an algorithm;
   extract, from the first QASM file, user metadata specifying a first number of qubits identified for implementation of the algorithm;
   receive hardware information of a plurality of quantum computer systems, wherein the hardware information comprises information about hardware capacities of the plurality of quantum computer systems;
   process the first QASM file by a logic analyzer that comprises a machine learning model trained to estimate a number of qubits that implement a quantum algorithm, wherein the machine learning model is trained with one or more training files, wherein each of the one or more training files comprises training quantum instructions that are executed, during training, on two or more of the plurality of quantum computer systems; and
   modify the first QASM file to generate a second QASM file in view of the user metadata, an output of the processing of the first QASM by the logic analyzer, and the received hardware information, wherein the second QASM file comprises one or more optimization recommendations, and wherein the one or more optimization recommendations comprise a second number of qubits estimated to implement the algorithm in at least one of the plurality of quantum computer systems.

* * * * *